March 15, 1932. K. C. D. HICKMAN 1,849,231
FILM FOR SOUND AND PICTURE RECORDS
Filed April 22, 1929
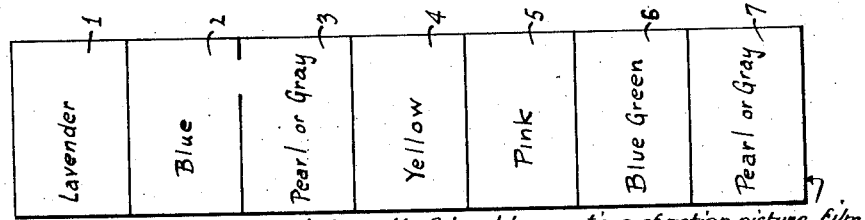
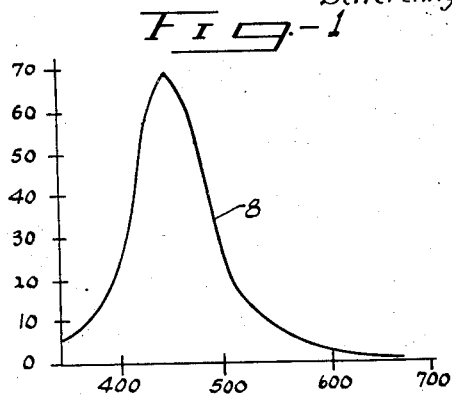
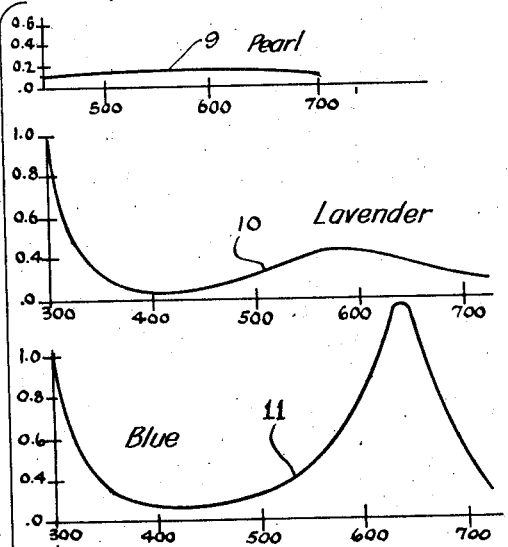
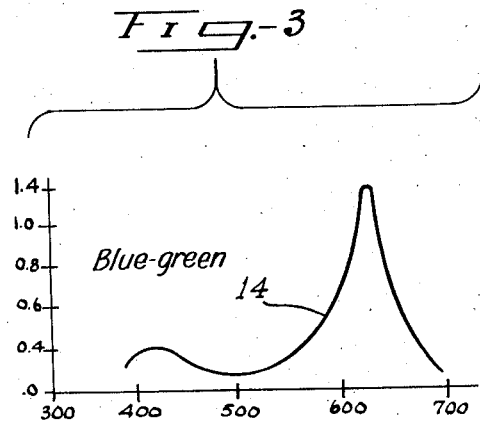
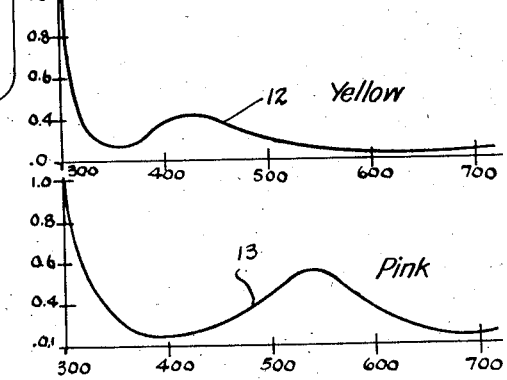
INVENTOR
KENNETH C. D. HICKMAN
BY
*Newton M. Perrine*
ATTORNEY Patented Mar. 15, 1932

1,849,231

UNITED STATES PATENT OFFICE

KENNETH C. D. HICKMAN, OF ROCHESTER, NEW YORK, ASSIGNOR TO EASTMAN KODAK COMPANY, OF ROCHESTER, NEW YORK, A CORPORATION OF NEW YORK

FILM FOR SOUND AND PICTURE RECORDS

Application filed April 22, 1929. Serial No. 356,902.

This invention relates to tinted films for use in the synchronized reproduction of sound and motion pictures from the same photographic record.

It is now standard practice in the reproduction of the so called "silent" motion pictures to employ films tinted or colored to present pleasing visual effects when projected on a screen. Such tinted films have not gone into commercial use for the reproduction of sound and motion pictures from the same record since the various commercial tints absorb the different wave length radiations to different degrees and therefore affect a light sensitive cell functioning therewith in such a manner that unpleasant sound volume changes are experienced in passing from one section of tinted film to another. The most unpleasant sound volume change encountered in the course of reproducing such a sound picture, is experienced in passing from a colored section of film to an uncolored section or vice versa.

In accordance with one feature of this invention it is proposed to treat uncolored sound record film with an achromatic, light absorbing material so that it may be combined with sections of variously tinted sound record film without undesirable volume changes occuring when said sections are used in sequence to reproduce sound.

In accordance with another feature of the present invention, it is proposed to replace the "clear" or uncolored sound record film by film tinted with a neutral tint having such density that it absorbs on the average as much of the actinic radiation as is absorbed by the colored film selected for use with it.

These and other features will appear from the detailed description and claims when taken with the drawings in which Fig. 1 is a strip of motion picture film showing a series of tinted sections; Fig. 2 is the response curve of a photoelectric cell suitable for use with the tinted film of Fig. 1; while Fig. 3 is a series of curves representing the density of the neutrally tinted sections and the remainder of the series of tinted sections shown in Fig. 1.

In a copending application of Loyd A. Jones, which has matured into Patent No. 1,769,518, granted July 1, 1930, there is disclosed a series of film sections tinted with coloring materials or dyes that have relatively low absorption in the region to which a light sensitive cell is most efficient so that the various film sections do not absorb an appreciable fraction of radiation used for sound reproduction and yet permit sufficient absorption of the radiations of these wave lengths to which the eye is sensitive so that desired colors or tints can be obtained. In Fig. 1 there is shown a strip of film suitable for bearing motion picture exposure areas and a sound record comprising such film sections as 1, 2, 4, 5, and 6 respectively tinted lavender, blue, yellow, pink and blue-green which may be joined in any desired combination in accordance with the teachings of the mentioned application. It has been found, however, that if these sections of film are combined with an untinted section of film, an unpleasant sound volume change is encountered at the change-over from the tinted to an untinted or "clear" section of film. In following the teaching of the present invention the so called "clear" or untinted film is replaced by a neutral tint such as pearl or gray (shown at 3 and 7 of Fig. 1) which absorbs radiations non-selectively in the visible region so that it has no chromatic characteristics but appears "clear" or uncolored, to prevent these undesired sound volume changes in passing from a section of uncolored film to colored film sections or vice versa. The average colume depression of the series of tints proposed in the mentioned application is approximately three transmission units so that this hueless tint such as pearl or gray should be adjusted to give a volume depression of three transmission units which is approximately the mean depression of the entire group of tints. In this way the hueless pearl or gray section of film may be joined together with other tinted sections in any desirable sequence without producing any intolerable volume change at the change-over of one section to another.

It should be understood that the film of the present invention may be compounded to function with any radiation sensitive or photoelectric cell and may be used either alone or joined with sections of tinted film but for purposes of this description it is assumed that the present film is used with a photoelectric cell and light source having the characteristics shown in the response curve 8 of Fig. 2 and with one or more sections of differently tinted film having the density of radiation absorbing characteristics represented by density curves 9 to 14 inclusive of Fig. 3. In Figs. 2 and 3 the abscissæ represent wave lengths. The ordinates in Fig. 2 represent the response, by an arbitrary scale, of a cell subjected to light of uniform intensity and different wave lengths. The ordinates in Fig. 3 represent density by an arbitrary scale. It will be understood that curves 9 to 14 in this figure represent the density of sections of film respectively tinted pearl, lavender, blue, yellow, pink and blue green.

While it is appreciated that various materials may be used to give the effect of the mentioned hueless tint a suitable material comprises a pearl tint which may be made by combining Zapon black, Metanil yellow, and Toludine blue in such proportions as to give a base which is visually nonselective.

All of the dyes mentioned are well known and their physical and chemical properties and structures may be found in the usual encyclopaedias or catalogs of dyes.

Density throughout this description is used as a designation of the light or radiation absorbing characteristic of the transmission material and is defined as the logarithm of the reciprocal of the transmission.

It should be understood that the present disclosure is for purposes of illustration only and that this invention includes all modifications and equivalents which fall within the scope of the appended claims.

What I claim is:

1. A photographic film comprising a support, a sensitized emulsion on said support providing a series of exposure areas and a sound record area, said film being designed for use with a tinted film of similar structure for the simultaneous reproduction of tinted motion pictures with sound accompaniment, said first film being provided with a layer of neutral color having a radiation absorbing power of the same order as that of the tinted film in that region of the spectrum useful for sound reproduction.

2. A photographic film for use in the simultaneous reproduction of motion pictures with sound accompaniment having a layer of neutral color applied thereto adjusted to have a radiation absorbing power such that it produces a volume depression when reproduced of the order of three transmission units as compared with a similar film that is untinted.

3. A photographic film for use in the simultaneous reproduction of motion pictures with sound accompaniment bearing a layer having incorporated therein a hueless tint adjusted to give a volume depression of the order of three transmission units as compared with a similar film that is untinted.

4. In combination with a light sensitive element predominantly sensitive to rays of a limited portion of the spectrum and a source of radiations, a motion picture film band carrying both a sound record and a picture record throughout its length, said film band comprising a plurality of sections each uniformly tinted with a different tint over its entire area, one of said tints being a hueless tint, all of said tints having the characteristic that each tinted film section will have a radiation absorbing power substantially equal to the radiation absorbing power of every other section when measured in terms of the particular light sensitive element and radiation source used therewith.

5. In combination, a light sensitive element and a source of radiations, a motion picture film band having a motion picture record and a sound record throughout its length, said light sensitive element being responsive to radiations from said source transmitted through said sound record to produce sound, sections of said film being tinted over their entire area, one of said sections being tinted with a hueless tint, each remaining section being tinted with a different color of the visible spectrum, said tints having the characteristic that they will produce variations in the absorbing power when evaluated in terms of the particular light sensitive element and the radiation source used, less than a predetermined allowable sound volume variation.

6. In combination with a light sensitive element, a motion picture film band carrying both a sound record and a picture record throughout its length, said film band comprising a plurality of sections each uniformly tinted with a different tint over its entire area, one of said tints being a neutral tint, said tints having the characteristic that each tinted film section will transmit not less than fifty per cent nor more than seventy per cent of the radiations to which the light sensitive element is sensitive.

7. A photographic motion picture film strip of standard dimensions for use with any of a series of differently colored strips in the projection of motion pictures with audible accompaniment and having substantially uniform, useful transmission characteristics in a definite region of the spectrum used in sound reproduction, said first mentioned film strip having over its entire area a uniform, visually neutral layer, having the same transmission characteristics in said definite region as the colored strips with which it is intended for use.

Signed at Rochester, New York, this 17th day of April, 1929.

KENNETH C. D. HICKMAN.